(12) United States Patent
Fountain

(10) Patent No.: US 6,321,685 B1
(45) Date of Patent: Nov. 27, 2001

(54) LATCH FOR BIRDCAGE DOOR

(76) Inventor: D-Arcy Fountain, 11712 NE. 14th St., Vancouver, WA (US) 98684

( * ) Notice: Subject to any disclaimer, the term of this patent is extended or adjusted under 35 U.S.C. 154(b) by 0 days.

(21) Appl. No.: 09/574,399

(22) Filed: May 19, 2000

(51) Int. Cl.[7] ............................. A01K 1/08; A01K 31/00; A01K 31/10
(52) U.S. Cl. ............................. 119/427; 292/238; 119/428
(58) Field of Search ............................. 119/427, 428, 119/416, 429, 430, 431, 432, 434, 435; 292/238, 202, 204, 61

(56) References Cited

U.S. PATENT DOCUMENTS

| | | | | |
|---|---|---|---|---|
| 1,662,687 | * | 3/1928 | Tullis | 119/429 |
| 4,082,337 | * | 4/1978 | Greco | 292/338 |
| 5,511,835 | * | 4/1996 | Hardee | 292/238 |
| 5,957,086 | * | 9/1999 | Gallardo | 119/429 |
| 6,003,908 | * | 12/1999 | King | 292/61 |

* cited by examiner

Primary Examiner—Charles T. Jordan
Assistant Examiner—Judith A. Nelson
(74) Attorney, Agent, or Firm—Klarquist Sparkman, LLP

(57) ABSTRACT

A birdcage has a movable wing above its door opening. The wing is pivotally mounted such that the wing can be rotated between a first position wherein the wing extends downwardly from its pivot axis to a level below the top of the door and a second position wherein the wing does not extend downwardly from the pivot axis to a level below the top of the door. The wing works in combination with a traditional latch that is located lower, along the free side of the door. Because the wing and latch are spaced apart, a bird cannot reach both at the same time and cannot unlock the cage. The wing also acts as a safety device that can be used to prevent leg crushing. When the cage door is open, the wing hangs down and blocks a portion of the door opening. If the cage door is inadvertently bumped, the door cannot swing fully to the closed position because the wing blocks its travel.

12 Claims, 1 Drawing Sheet

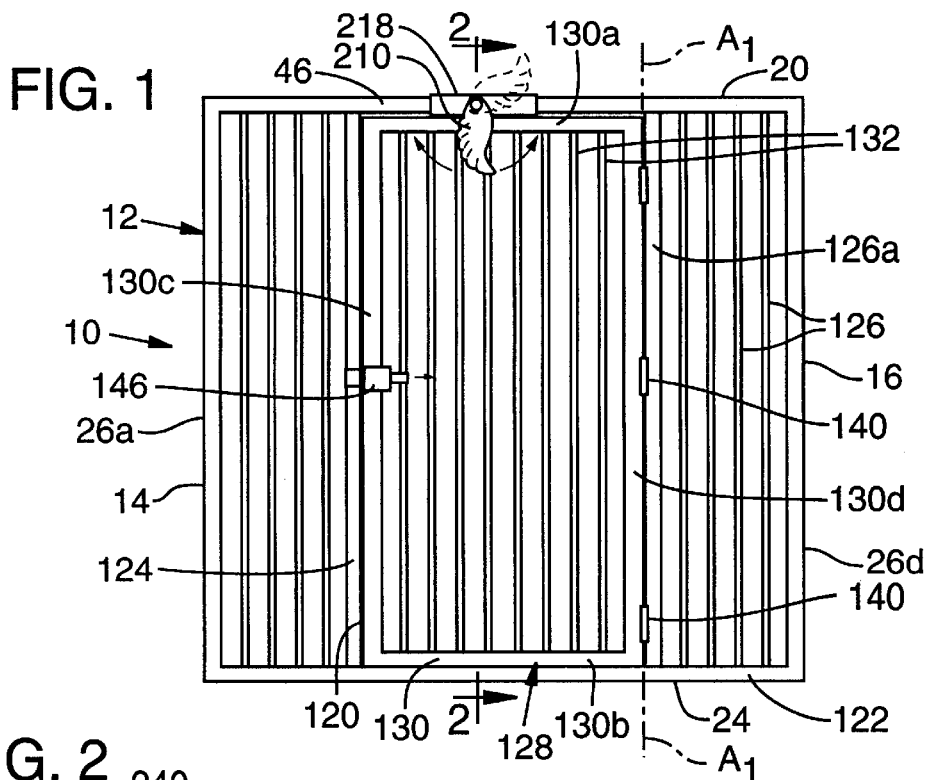
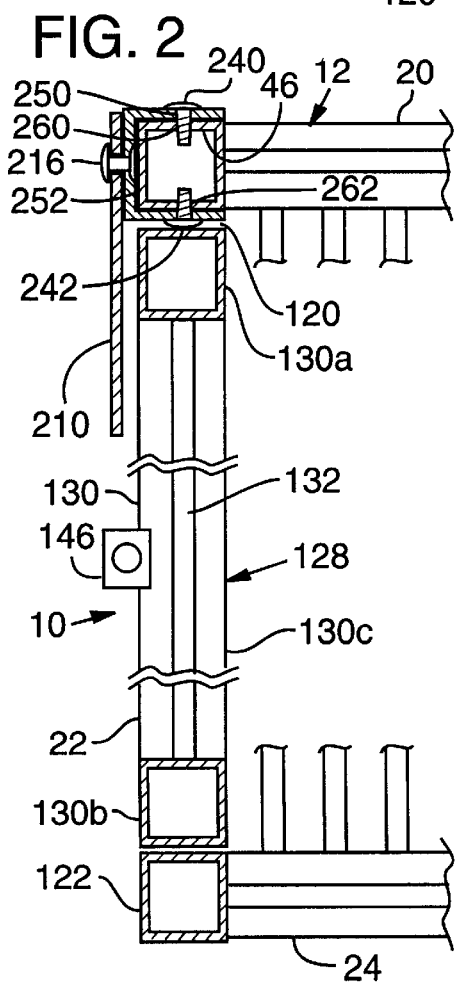
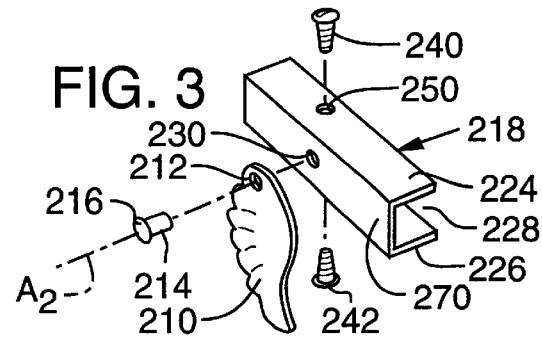
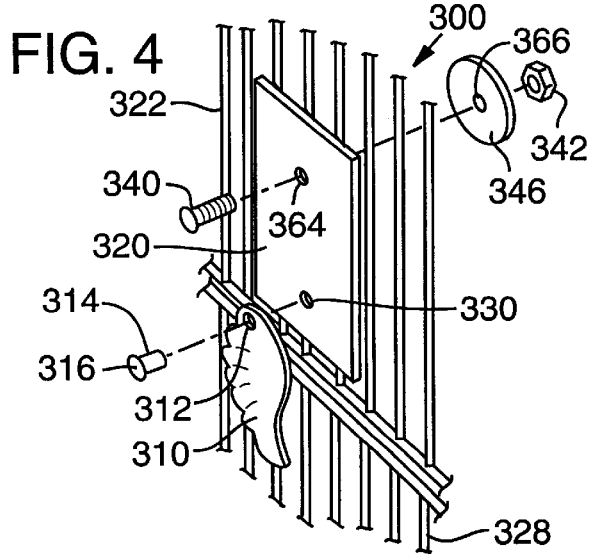

LATCH FOR BIRDCAGE DOOR

BACKGROUND AND SUMMARY OF THE INVENTION

This invention relates to animal cages and more particularly to bird cages having hinged doors.

Cages for birds are well known and have been in use for any years. Most modem cages have four vertical walls made of metal bars, a floor and a ceiling. In such cages, particularly those intended for use by large birds such as larger parrots, at least one vertical wall has a framed opening for a hinged door. Typically the door is made of metal bars with hinges along one side. The door is hinged so that it opens by swinging about a vertical axis of rotation. In most cases the axis of rotation extends vertically along the right side of the door as viewed from the outside of the cage.

The door is provided for ingress and egress of a bird and to provide access for cleaning the cage. The door typically has horizontal top and bottom bars and has a latch mechanism located on the nonhinged side of the door between the levels of the top and bottom bars. The latch is to secure the door in a locked position with the door covering an opening into the interior of the cage to keep the bird inside. When a person opens the door, the bird may be lifted out of the cage or will walk out on its own. A bird that walks out of such a cage naturally climbs up to be in an elevated position and most frequently ends up standing on the top horizontal bar of the door, which serves as a convenient perch.

It is a long-recognized problem that birds are intelligent and can learn how to operate latch mechanisms. Thus it is common for a bird to learn how to defeat the latch mechanism of a typical cage and release itself This problem has been addressed in the past by adopting increasingly complex latch mechanisms to outsmart the birds. But this adds to the cost and complexity of a cage and does not always work.

It is another problem with common cages that, when a bird stands on the top bar of the door, the door can swing accidentally to the closed position. This can happen when, for example, a person inadvertently bumps into the door. If a door is rotated all the way to the closed position when a bird is perched on top, the bird's feet are crushed between the top bar of the door and the door frame. This can cause permanent injury to the bird.

The present invention provides a simple and inexpensive way to make it virtually impossible for a bird to open the latched door of its cage. It also can be used to protect birds from foot crushing incidents. In one aspect, existing cages can be retrofitted inexpensively to have the benefits of the present invention.

This is accomplished by providing a cage with a movable wing above the door opening. The wing is pivotally mounted such that the wing can be rotated between a first position wherein the wing extends downwardly from its pivot axis to a to a level below the top of the door and a second position wherein the wing does not extend downwardly from the pivot axis to a to a level below the top of the door. The wing works in combination with a traditional latch that is located below the wing, along the free side of the door. Because the wing and latch are spaced apart, a bird can not reach both at the same time and cannot unlock the cage.

Quite separate and apart from its function as a latch, the wing is a safety device that can be used to prevent leg crushing. When the cage door is open, the wing hangs down and blocks a portion of the door opening. If the cage door is inadvertently bumped, the door cannot swing fully to the closed position because the wing blocks its travel. This prevents a bird's feet from being caught between the door and the door frame.

DESCRIPTION OF THE DRAWINGS

FIG. 1 is an elevational view of a front of a cage equipped according to this invention.

FIG. 2 is a vertical, sectional view taken along line 2—2 of FIG. 1.

FIG. 3 is an exploded view showing a first retrofit latch device according to the invention.

FIG. 4 is an exploded view showing a second retrofit latch device according to the invention.

DETAILED DESCRIPTION

A cage of this invention is shown generally in FIGS. 1–2 and designated 10. The cage 10 includes a rectangular shaped enclosure 12 defined by sidewalls 14, 16, a back wall (not shown), a top wall 20, a front wall 22, and a bottom wall 24. A set of corner posts, including front comer posts 26a and 26b, connects the walls 14–24. It should be understood however that other arrangements of walls could be used. The top wall 20/front wall 22 include a horizontally positioned front top bar member 46 that is made from hollow channel or box material.

In the front wall 22 is a door opening 120 defined by the top wall front top bar member 46 and a front wall bottom frame member 122. Sides of the door opening 120 are formed by a door frame vertical member 124 and a front wall side enclosure bar 126a. The side enclosure bar 126a may be one of a series of spaced apart, vertically positioned front wall side enclosure bars 126. These front wall side enclosure bars 126 have ends joining the top wall front top bar member 46 and the front wall bottom frame member 122.

A door 128 fits in the door opening 120 and includes a perimeter 130 comprising a top and bottom segment 130a, 130b that are connected by an outer side segment 130c and an inner side segment 130d. Extending between the perimeter top and bottom segments 130a, 130b is a set of spaced apart, vertically positioned door enclosure bars 132. The door is hinged at its right side. In particular, hinges 140 connect the front wall side enclosure bar 126a and the inner side segment 130d. These hinges 140 have a generally vertical axis of rotation $A_1$. The door perimeter vertical segment 130c is fitted with a latch 146.

To prevent unintended movement of the door 128, the cage is fitted with a wing 210 that is pivotally mounted to the wall 22 at a position above the door 128. The wing 210 has a hole 212 that receives the shaft 214 of a rivet 216 that serves as an axle about which the wing 210 can rotate. The wing 210 is sized and positioned such that the wing 210 can be rotated between a first position, shown in the drawing, wherein the wing 210 extends downwardly from the pivot axis to a level below the top of the door 128 and a second position, shown in broken lines in FIG. 1, wherein the wing 210 does not extend downwardly from the pivot axis to a level below the top of the door 128. When the wing 210 is in the first position, the door 128 cannot be moved between opened and closed positions. When the wing 210 is rotated to the second position, shown by broken lines in FIG. 1 the door 128 can be opened or closed as desired.

In the embodiment of FIG. 1, the wing 210 is mounted on the top bar 46 of a door frame by a channel member 218. The illustrated channel member 218 is generally U-shaped in cross section and has a web portion 220 and two spaced-apart flange portions 224, 226 extending from the web portion 220. The channel member 218 defines a groove 228 that mates with and receives the top bar 46. Most large bird cages have a top bar 46 that has either a ½ inch or ¾ inch vertical dimension, so the flanges should be spaced to provide a groove that can accommodate a top bar 46 of one or both of those dimensions. The rivet 216, which serves as a pivot pin, extends from the web 220 and through the hole defined by the wing 210 so that the wing can rotate about an axis of rotation that coincides with the axis $A_2$ of the rivet 216. The rivet 216 also extends through an opening 230 in the web 220, although other methods of securing a pivot pin would be possible.

The channel member 218 is secured to the cage by a fastener system comprising two self-tapping sheet metal screws 240, 242. The shafts of the screws 240, 242 extend through holes 250, 252 in the flanges 224, 226. The top bar 46 defines holes 260, 262 that receive the screws so that the channel member 218 is secured to the top bar 46 with the top bar received in the groove.

Other fastener systems could be used for securing the channel member 218. A set screw could extend through a threaded opening in one of the flanges so that the channel member 218 could be secured by means of frictional engagement between the set screw and the opposing flange with the top bar 46 squeezed therebetween. No hole through the top bar 46 is required when a set screw is used. Alternatively, a body of glue or some other adhesive material could be provided between the channel member 218 and top bar 46 to hold the channel member in place. Still another attachment system could employ a bolt and a mating hat nut. The shafts of the bolt and nut would extend through opposed, coaxial holes in the flanges. The hole defined by one flange would be sized to receive the shaft of the bolt and the hole defined by the other flange would sized to receive the shaft of the hat nut. The holes would be aligned so that the bolt and hat nut can extend through the respective holes and could engage one another. The top bar 46 would define vertically aligned holes that also would receive the bolt and nut shafts so that the channel member 218 would be secured to the top bar 46 with the top bar received in the groove.

The wing 210 could be mounted in other ways. A pivot pin could, for example, extend directly from the top bar 46 without an intervening channel member. The pivot pin could be welded to the top bar 46 or could have an end portion secured in a cavity or hole drilled horizontally into the top bar 46.

It is also possible to mount the wing using a backing plate system 300 as shown in FIG. 4. A backing plate mounting system is particularly useful if the cage is constructed without a thick top bar over the door opening. For example, cages for smaller birds have door openings framed with wire, with no thick top bar, so it is not convenient to use a channel member for mounting. The illustrated back plate system 300 includes an outer plate 320 that bears a pivot pin 316 for a wing 310. The system also has an inner plate 346, such as the illustrated fender washer. Both the outer and inner plates 320, 346 have openings 364, 366 to receive the shaft of a fastener. The illustrated fastener is a bolt 340 and nut 342, with the bolt having a shaft sized to fit though both plate openings 364, 366. The plates are located on opposite sides of the wall so that when the nut 342 is tightened on the bolt 340, the plates 320, 346 move toward each other and wire bars of the front wall 322 are sandwiched tightly between the plates. When installed, the wing 310 hangs down to block movement of the door 328.

The pivot axes $A_2$ of the illustrated wings 210, 310 extend generally horizontally and perpendicular to the walls 22, 322. This is the preferred arrangement for most cages, but some variation is possible. For a cage having a curved wall, the preferred arrangement is for the axis to extend generally normal to a tangent to the curve of the wall.

It is best for the wing to be located so that its pivot axis $A_2$ is horizontally displaced from 2 to 3 inches from the door hinge axis $A_1$. If the wing is located more than 3 inches from the door hinge axis $A_1$, the door may be able to swing too far toward the closed position, thereby endangering the feet of a perched bird. If the wing is located too close to the door hinge axis, a large bird might be able to force the door partially open. When pressure is applied to the closed door from inside the enclosure, the door acts as a lever with the wing as its fulcrum, so it is best that the wing not be too near the door hinge axis $A_1$.

The parts of the wing system are best made of a rust resistant material such as stainless steel, aluminum or powder coated steel.

Operation of the wing mechanism is simple and intuitive. Normally the wing hangs in front of a closed door preventing it from swinging open. To gain access to the enclosure, the normal latch 146 is released and the wing is moved to the second position so that the door can be rotated about the hinge axis $A_1$. The door is then moved from the closed position to the open position whereafter a bird can be removed from the enclosure by passing it through the door opening. To serve as a safety stop, the wing is then moved back to the first position while the door is sufficiently open, so that it does not block the decent of the wing. When in the first position, the wing blocks the open door from closing. Because the wing is located above the door opening and is pivoted freely, the wing is influenced by gravity and automatically moves to the first position whenever a person is not holding it in the second position. To close the door, the procedure is reversed, with the wing being rotated to the second position while the door is being closed.

While an embodiment, uses, and advantages of this invention have been shown and described, it should be understood that this invention is limited only by the scope of the claims. Those skilled in the art will appreciate that various modifications or changes may be made without departing from the scope and spirit of the invention, and these modifications and changes may result in further uses and advantages.

What is claimed is:

1. A birdcage comprising:
   at least one wall that defines an enclosure suitable for housing a bird, the wall also defining a door opening;
   a door hingedly connected to the wall so the door can swing about a generally vertically extending hinge axis between a closed position wherein the door covers the door opening and an open position;
   a wing pivotally mounted to the wall at a position above the door such that the wing can be rotated between a first position wherein the wing extends downwardly from the pivot axis to a to a level below the top of the door and a second position wherein the wing does not extend downwardly from the pivot axis to a level below the top of the door.

2. A birdcage according to claim 1 further comprising:
   a door frame including a top bar that extends across the top of the door opening;
   a channel member comprising a web portion and two spaced-apart flange portions extending from the web portion, the channel member defining a groove that is sized and shaped to receive the top bar; and a pivot pin that extends from the web and through a hole defined by the wing so that the wing can rotate about an axis of rotation that coincides with the axis of the pin.

3. A birdcage according to claim 1 further comprising:

a backing plate;

a fastener that secures the backing plate to the wall at a position above the door; and a pivot pin that extends from backing plate and through a hole defined by the wing so that the wing can rotate about an axis of rotation that coincides with the axis of the pin.

4. A birdcage according to claim 1 wherein the wing pivot axis is horizontally displaced from 2 to 3 inches from the hinge axis.

5. A retrofit latch device adapted to be mounted above the door opening of a bird cage having a door frame including a top bar that extends across the top of the opening, the device comprising:

a channel member comprising a web portion and two spaced-apart flange portions extending from the web portion that together define a groove that is sized and shaped to receive the top bar of a bird cage door frame;

a fastener to secure the channel member to the top bar when the top bar is received in the groove; and a wing pivotally mounted to the web so that the wing can rotate about an axis of rotation that extends through the web; and a fastener to secure the channel member to the top bar of a bird cage door frame when the top bar is received in the groove.

6. The latch device of claim 5 wherein:

the fastener comprises at least one screw; and at least one of the flanges defines an opening to receive the screw.

7. The latch device of claim 5 wherein:

the fastener comprises a bolt and a mating nut; and each flange defines a hole sized to receive the bolt, the holes being aligned so that the bolt can extend through both of the holes and through a hole defined by the top bar when the top bar is received in the groove.

8. The latch device of claim 7 wherein:

the fastener comprises a bolt and a mating hat nut;

one flange defines a hole sized to receive the shaft of the bolt; and the other flange defines a hole sized to receive the shaft of the hat nut, the holes being aligned so that the bolt and hat nut can extend through the respective holes and so that at least the bolt shaft can extend through a hole defined in the top bar when the top bar is received in the groove.

9. The latch device of claim 5 wherein the fastener comprises a body of adhesive material.

10. A method for securing a bird in a cage comprising:

providing a cage having at least one wall that defines an enclosure suitable for housing a bird, with the wall also defining a door opening, a door hingedly connected to the wall so the door can swing about a generally vertically extending hinge axis between a closed position wherein it covers the door opening and an open position, and a wing pivotally mounted to the wall at a position above the door such that the wing can be rotated between a first position wherein the wing extends downwardly from the pivot to a level below the top of the door and a second position wherein the wing does not extend downwardly from the pivot to a level below the top of the door;

placing the bird in the enclosure by passing it through the door opening;

positioning the wing in the second position so that the door can be rotated about the hinge axis;

moving the door to the closed position; and moving the wing to the first position wherein it blocks the door from opening.

11. A method for releasing a bird from a cage comprising:

providing a cage having at least one wall that defines an enclosure suitable for housing a bird, with the wall also defining a door opening, a door hingedly connected to the wall so the door can swing about a generally vertically extending hinge axis between a closed position wherein it covers the door opening and an open position, and a wing pivotally mounted to the wall at a position above the door such that the wing can be rotated between a first position wherein the wing extends downwardly from the pivot to a level below the top of the door and a second position wherein the wing does not extend downwardly from the pivot to a level below the top of the door;

positioning the wing in the second position so that the door can be rotated about the hinge axis;

moving the door from the closed position to the open position;

removing a bird from the enclosure by passing it through the door opening; and moving the wing to the first position wherein it blocks the door from closing.

12. The method of claim 11 wherein the wing is moved to the first position by releasing the wing so that is rotates under the influence of gravity to the first position while the door is sufficiently open that it does not block the decent of the wing.

* * * * *